Figure 5:
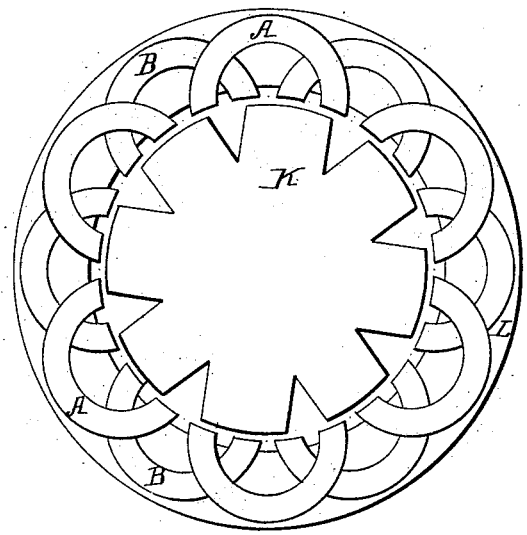

(No Model.) 2 Sheets—Sheet 1.
W. DECKER.
ARMATURE FOR DYNAMO ELECTRIC MACHINES OR MOTORS.
No. 549,234. Patented Nov. 5, 1895.
Fig.1.
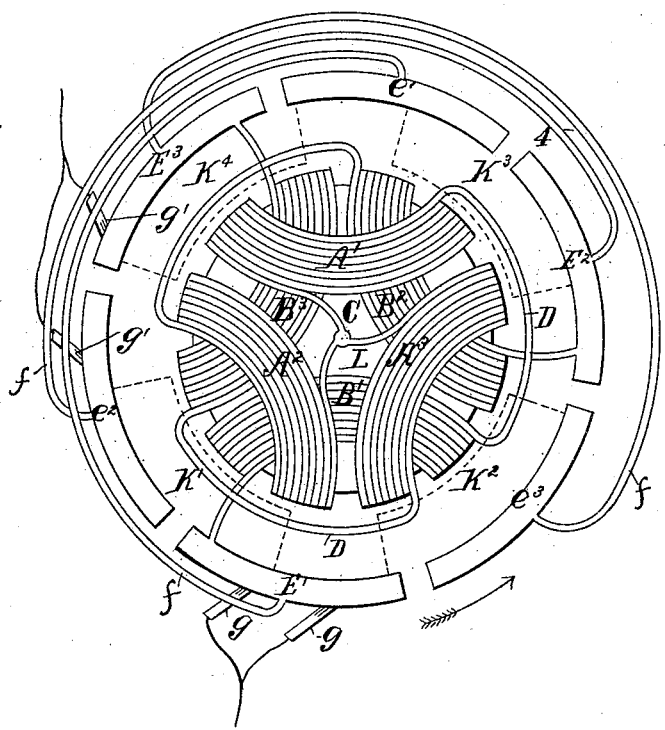
Fig.3.
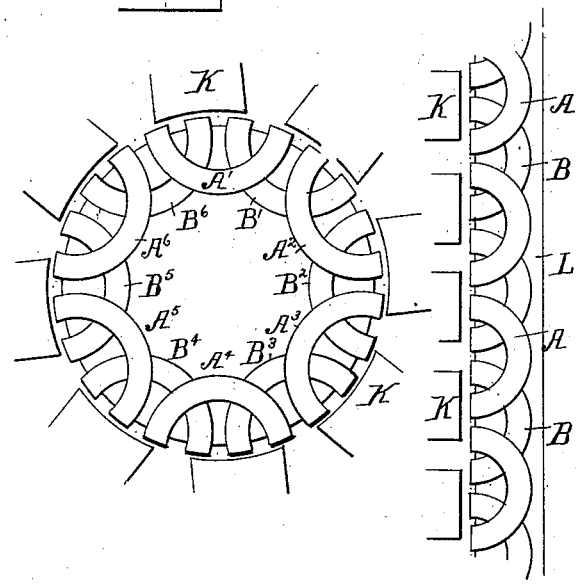
Fig.2.
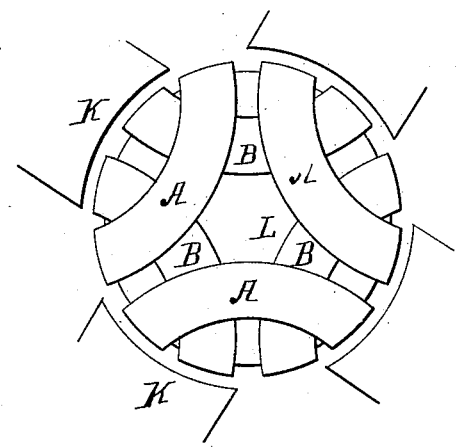
Fig.4.
Witnesses
Wm H. Courtland
Leocadia M. Lennan.
Inventor
Ward Decker,
By his Attorney,
Edward P. Thompson
ANDREW B.GRAHAM. PHOTO-LITHO. WASHINGTON.D.C.

(No Model.) 2 Sheets—Sheet 2.

W. DECKER.
ARMATURE FOR DYNAMO ELECTRIC MACHINES OR MOTORS.

No. 549,234. Patented Nov. 5, 1895.

Witnesses
Wm H. Courtland
Leocadia M. Lennan

Inventor
Ward Decker,
By his Attorney,
Edward P. Thompson

UNITED STATES PATENT OFFICE.

WARD DECKER, OF OWEGO, NEW YORK.

ARMATURE FOR DYNAMO-ELECTRIC MACHINES OR MOTORS.

SPECIFICATION forming part of Letters Patent No. 549,234, dated November 5, 1895.

Application filed November 17, 1892. Serial No. 452,261. (No model.)

*To all whom it may concern:*

Be it known that I, WARD DECKER, a citizen of the United States of America, and a resident of Owego, in the county of Tioga, State of New York, have invented certain new and useful Improvements in Electric Motors or Dynamos, (Case No. 3,) of which the following is a specification.

My invention relates to the coils of armatures of multipolar electric machines whose poles number four, eight, twelve, or any number of which four is a multiple, whether for use as motors or for generating electricity, and which are equally adapted to either armatures wound with wire or armatures known as "bar-armatures."

My invention provides, also, a system of winding for armatures for certain multipolar electric machines having six, twelve, eighteen, or any number of coils or windings of which six is a multiple, the number used depending on the number of poles employed in the particular machine. For instance, a four-pole machine requires six armature-coils, an eight-pole machine twelve, and machines with larger number of poles require rmature-coils in the same proportion.

My system consists in winding two groups of coils, each group being of an equal number of coils, on the armature-core, the coils in one group differing from the coils in the other group only in length in what may be called their "axial line" as compared with the axis of the armature-core to which they are applied, and for convenience in distinguishing the two groups I will designate them as composed of long and short coils, and the coils in these two groups are always connected in such a manner that a long coil or combination of long coils is always in series with a short coil or combination of short coils.

One object of my invention is to provide an armature-winding composed of coils connected permanently in sets composed of one or more short coils connected in series with one or more long coils in such a manner that each set will contain an equal uniform length or amount of wire, thus securing uniform resistance in the several circuits and a practically perfect equilibrium throughout the armature-conductors. This object is attained in machines containing eight poles or more by connecting the coils in sets of more than two—that is, two or more short coils in such machines may be connected in multiple and the coils so connected put in series with the same number of long coils connected in the same manner as the short coils, or several long and short coils in series with each other may be connected in multiple, as in any of these ways my object is attained of making sets of coils whose length of wire and resistance are the same, and all coils connected in multiple to form such sets are equal in size and resistance.

Another object of my invention is to provide a winding for certain armatures capable of being insulated more perfectly and with greater ease than heretofore. Each coil of my winding may be separated from adjacent coils by an air-space, if necessary, or by any suitable insulating material. I know of no prior dynamo-electric machine of which the same can be said to be accomplished with the ease and facility as in this system.

Another object of my invention is to enable all of the conductor coils or windings to be readily removed from the armature-core without altering or varying their form or without liability of injuring the insulating-covering of the wire, and this is accomplished in part by my method of connecting the coils.

To more particularly describe my invention, I refer to the accompanying drawings.

Figure 6:
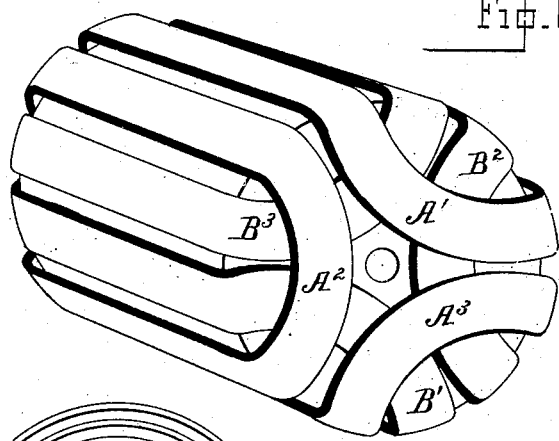
Figure 7:
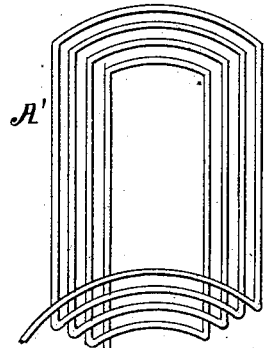

Figure 1 illustrates the position of the windings and mode of connecting together with the commutator and brushes of a four-pole machine as seen looking directly at one end of the armature. Fig. 2 is an end elevation of armature, showing position of coils on a fore-pole machine. Fig. 3 is an end view of armature, showing position of coils on an eight-pole machine. Fig. 4 only shows coils arranged in straight lines before poles, merely illustrating that this disposition of coils may be extended indefinitely. Fig. 5 shows how this winding can be applied to the inside of a ring-armature with internal poles and still be capable of ready removal. Fig. 6 shows a perspective view of coils as laid on armature-core. Fig. 7 shows the general direction of wire in a coil having one layer.

In Fig. 1, L represents the end of an armature-core.

$A' A^2 A^3$ are three long coils wound to exactly the same size and shape and laid on the core, and each extends through one hundred and twenty degrees of its circumference.

$B' B^2 B^3$ are three short coils wound exactly alike and differing from the three long coils only in length. These three short coils are placed under the three long coils in such a manner that their adjacent sides occupy the vacant spaces left by the open interiors of the under coils. These last short coils extend, also, each of them, over one hundred and twenty degrees of the armature circumference. For convenience I will designate the ends of the wires in the coils as "outside" and "inside," according as these ends are nearest or farthest from the center of the armature, as clearly shown in the drawings. The outside ends of coils $B' B^2 B^3$ are connected, respectively, to the commutator-sections $E' E^2 E^3$, and each of these commutator-sections is connected to the diametrically-opposite sections $e' e^2 e^3$, respectively, as shown, by the connections $f f f$. The inside ends of these coils $B' B^2 B^3$ are respectively connected to the outside ends of the diametrically-opposite coils $A' A^2 A^3$ by the connections $D D D$, and the inside ends of coils $A' A^2 A^3$ are all connected together at C.

L is the armature-core, and $K' K^2 K^3 K^4$ are poles of alternate polarity.

The action of the machine as a generator of electricity is as follows: Suppose a current to be flowing in a direction from the brushes $g g$ to the brushes $g' g'$, (these brushes overlapping and adjustable, as will be more clearly explained hereinafter.) Coil $A'$, as shown in the drawings, is situated so that one side is at the center of pole $K^3$ and the other side in the same position relatively to pole $K^4$. Coil $B'$ is situated the same relatively to poles $K'$ and $K^2$. These two coils are connected in series with each other and to the commutator-section $E'$, upon which the brushes $g g$ bear. Coils $A^2$ and $B^2$ and $A^3$ and $B^3$ are all in relatively the same position toward the poles—that is, in the weaker region near their edges. These are connected in pairs, as described and illustrated, and by cross connection in the commutator to the sections $E^3$ and $e^2$, on both sections of which the brushes $g' g'$ bear.

The current of electricity generated in coils $A'$ and $B'$, assuming them to be in the position shown in the drawings, will necessarily be larger than that generated by the other coils $A^2$ and $B^2$ and $A^3$ and $B^3$ owing to their being situated in the strongest magnetic field. These coils $A'$ and $B'$ are therefore connected, first, to the commutator-section $E'$, then, and after being connected in series with each other, to the other coils at the common junction C. These coils $A^2$ and $B^2$ and $A^3$ and $B^3$ are generating a smaller amount of current owing to their situation near the edges of the poles, and therefore in a weaker field, and for this reason are joined in parallel by reason of the brushes $g' g'$ bearing on both sections $E^3$ and $E^2$, and, as before stated, these two coils in multiple are connected by the junction C in series with the coils $A'$ and $B'$.

Supposing the armature revolves in the direction indicated by the arrow, the next instant the set of coils $A^2$ and $B^2$ would be midway between the poles and furnishing no current to the circuit. At the same instant the brushes $g' g'$ will have left the section $e^2$ and the set of coils $A^2$ and $B^2$ will be thrown out of circuit. The sets of coils $A'$ and $B'$ and $A^3$ and $B^3$ will now be in positions of equal strength in the magnetic field, and therefore should be and are connected in series with each other. In another twelfth of a revolution the idle coils $A^2$ and $B^2$, now having reached the weak part of the opposite field, are in multiple with $A'$ and $B'$, and both are in series with $A^3$ and $B^3$, now in the strongest field; one-twelfth more and $A'$ and $B'$ are out of circuit and the remaining coils are in series; another twelfth and coils $A^2$ and $B^2$ are in series with the sets $A'$ and $B'$ and $A^3$ and $B^3$ in multiple, and in another twelfth $A^3$ and $B^3$ are out of circuit and the remaining coils in series. One more twelfth and coils $A'$ and $B'$ are in series with the sets $A^2$ and $B^2$ and $A^3$ and $B^3$ in multiple—a condition exactly the reverse to the first one noted, inasmuch as the coils are in the same relative positions to poles of opposite sign. The current is commutated as shown by the drawings.

No mention has been made of the cross connecting of the commutator in tracing these actions. It is obvious that it may be used instead of four sets of brushes at equal points on the commutator.

By changing the lap of the brushes the duration of an idle coil's time of being out of circuit is changed correspondingly.

It can readily be understood that in machines with more poles than four, the same system is preserved. For instance, in Fig. 3, representing an eight-pole machine, coils $B^2$, $A^4$, $B^5$, and $A'$ may all be connected in series as one set, or coils $B^2$ and $B^5$ may be connected in multiple, and the combination thus formed put in series with another combination formed by coils $A^4$ and $A'$ in multiple. The same invention of getting the coils in three sets exactly the same kind and size is the same in the different sizes of machines.

I claim as my invention—

1. In electric machines whose poles are four or whose number of poles is divisible by four, an armature winding composed of two groups of coils, the one group of coils differing only in length from the other group of coils, and these coils being connected electrically in sets of one or more short coils in series with an equal number of long coils whereby all are counterpart sets.

2. In electric machines whose poles are four or whose number of poles is divisible by four, an armature winding composed of two groups of coils, the coils in one group differing in length from the coils in the other group and connected electrically in sets composed of a number of short coils all electrically connected together and connected in series with an equal number of long coils, all connected
5 together, substantially as described.

In testimony that I claim the foregoing as my invention I have signed my name, in presence of two witnesses, this 7th day of November, 1892.

WARD DECKER.

Witnesses:
FRED C. HILL,
FRED. H. ELSTON.